United States Patent [19]

Stief et al.

[11] Patent Number: 5,589,242
[45] Date of Patent: Dec. 31, 1996

[54] HOUSING LINING

[75] Inventors: Reinhard Stief, Weinheim; Roger Schork, Mörlenbach; Gerhard Müller-Broll, Rimbach; Thomas Jost, Weinheim; Manfred Mattutat, Ladenburg; Klaus-Dieter Schmitt, Gorxheimertal, all of Germany

[73] Assignee: Firma Carl Freudenberg, Weinheim, Germany

[21] Appl. No.: 164,182

[22] Filed: Dec. 9, 1993

[30] Foreign Application Priority Data

Dec. 10, 1992 [DE] Germany ............... 42 41 515.2

[51] Int. Cl.[6] .................................................. E04B 1/82
[52] U.S. Cl. ................. 428/45; 428/131; 428/192; 428/171; 428/218; 428/288; 428/289; 181/198; 181/210; 181/293; 181/286
[58] Field of Search ............... 428/45,131, 192, 428/221, 292, 141, 218, 288, 289; 181/198, 210, 224, 293, 286

[56] References Cited

U.S. PATENT DOCUMENTS

| | | | |
|---|---|---|---|
| 2,124,463 | 7/1938 | Cunnington | 296/39.3 |
| 2,464,301 | 3/1949 | Francis, Jr. | 5/478 |
| 3,269,484 | 8/1966 | Lighter | 181/290 |
| 4,149,612 | 4/1979 | Bschorr | 181/286 |
| 4,242,398 | 12/1980 | Segawa et al. | 428/172 |
| 4,584,232 | 4/1986 | Frank et al. | 428/247 |
| 5,024,290 | 6/1991 | Birker | 181/293 |
| 5,410,111 | 4/1995 | Stief et al. | 181/286 |

FOREIGN PATENT DOCUMENTS 2040076  10/1991  Canada .
3621658C2  10/1990  Germany .

*Primary Examiner*—Kathleen Choi
*Attorney, Agent, or Firm*—Kenyon & Kenyon

[57] ABSTRACT

A housing lining for a piston engine, drive motor, or machine composed of a sound-absorbent layer of fibers. The fibers are compressed and glued to form an essentially pore-free supporting frame at least in the vicinity of the edge of the layer.

8 Claims, 2 Drawing Sheets

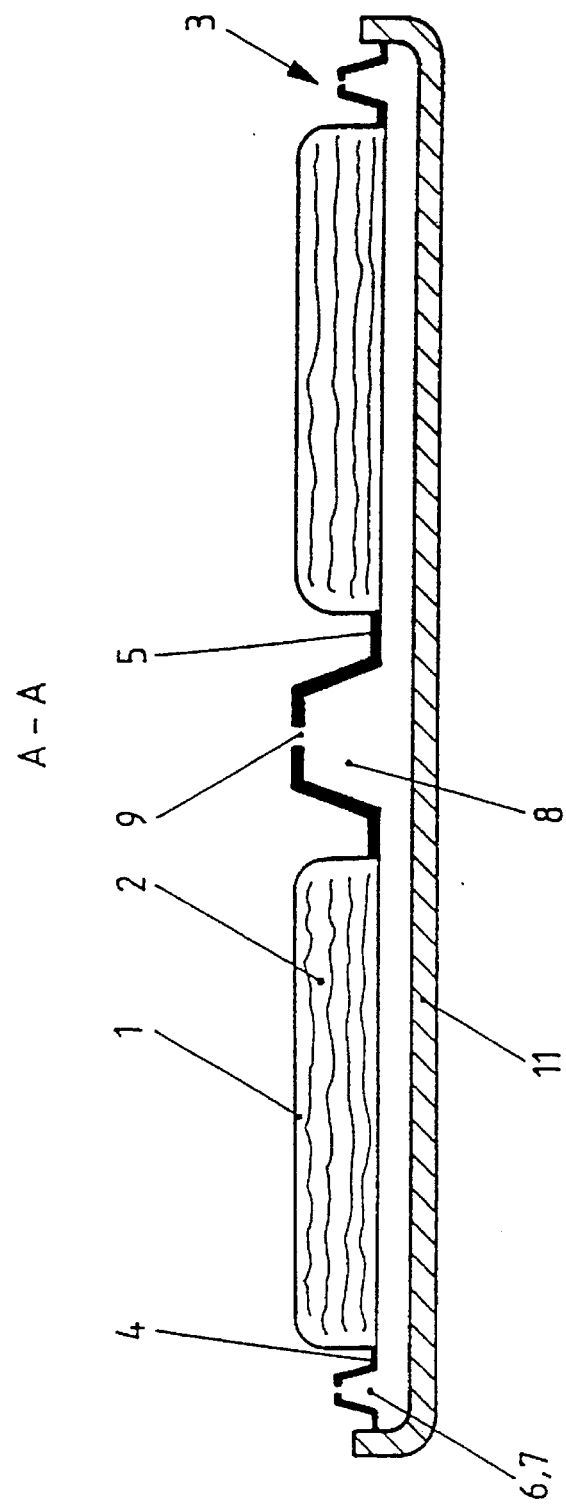

HOUSING LINING

FIELD OF THE INVENTION

The invention relates generally to a housing lining for a piston engine, prime mover, or machine, and more particularly to a housing lining composed of a sound-absorbent layer of fibers.

BACKGROUND OF THE INVENTION

A housing lining of this type is known from DE-OS 36 21 658. The housing lining consists of waste fiber materials mixed with binder, which produce a self-supporting unit when compressed under pressure and, if necessary, with the application of heat. Lattice-shaped pressing of the waste fiber materials forms an area of different compression, making the housing lining self-supporting. The mold consists of pillow-shaped individual elements compressed in the vicinity of their circumferential limits and therefore with a low specific volume in this area. The high dimensional stability of the known housing lining however is achieved at the expense of sound absorption, since the areas of slightly compressed fibers are comparatively small. In order to overcome this disadvantage, it is provided that a plurality of the above-mentioned housing linings be placed one above the other, requiring a relatively large amount of space.

SUMMARY AND ADVANTAGES OF THE INVENTION

An object of the invention is to develop a housing lining which improves sound absorption, especially at low frequencies, with a reduced space requirement.

The present invention therefore provides a housing lining comprising a sound-absorbent layer of fibers, the layer having an edge, the fibers being compressed and glued at least in the vicinity of the edge to form an essentially pore-free supporting frame which defines a supporting structure. The supporting structure may further comprise a supporting element formed of compressed and glued fibers within the supporting frame. Also provided is a method for making a housing lining comprising the steps of: (a) compressing a layer of fibers at least in the vicinity of an edge of the fibers; and (b) gluing the compressed area to form an essentially pore-free supporting frame.

The fact that the fibers are compressed and glued, at least in the vicinity of an edge surrounding the layer externally to form an essentially pore-free supporting frame, produces a dimensionally stable, self-supporting structure for the housing lining. Fastening to supports, covering hoods for example, also is simplified by this design. The supporting frame can have first fastening elements, for example, which can engage with second fastening elements of the support. An especially simple connection between the housing lining and the support can be formed by a snap connection.

The fibers can consist of cotton, for example.

According to one advantageous embodiment, additional fibers can be compressed and glued within the supporting frame to form an essentially pore-free supporting element. The supporting elements located inside the supporting frame can be formed as supporting ribs with an advantageous pattern which stiffens the supporting frame, e.g. an X-shaped pattern. Even when essentially pore-free supporting elements are used inside the supporting frame, a considerable portion of the housing lining consists of slightly compressed fibers, favoring good absorption of high frequencies. The supporting frame, supporting elements, and also Helmholtz resonators preferably have a surface which is 0.1 to 0.7 times as great as the total surface of the housing lining facing the sound source.

A further increase in dimensional stability can be achieved by providing the supporting frame and/or the supporting element with at least one convexity and/or concavity of its profile extending parallel to its lengthwise direction. A U-shaped profile for the frame and/or the supporting elements results in increased bending and torsional rigidity.

The supporting frame and/or supporting element can be provided at at least one point with a cup-shaped convexity provided to form a Helmholtz resonator with an opening in the front for air to pass through. The one-piece design of Helmholtz resonators with the housing lining allows absorption of different, but preferably low, frequencies when the Helmholtz resonators are so designed. In particular, the sound-absorbent molded body according to the invention has a low height when Helmholtz resonators are located in the vicinity of the frame and/or the supporting elements. Helmholtz resonators can be varied in their volume, the diameter of their through opening, and in their neck length in such a way that very good sound absorption can be adjusted to the individual requirements of each application. It is of significant importance for simple manufacture of the housing lining that the Helmholtz resonators may be made integral with the fiber layer and can form a part of the pore-free, air-impermeable frame and/or the supporting element. The Helmholtz resonators preferably cover 25 to 60% of the total area of the lining.

Convexities in a dense sequence can be provided along the supporting frame and/or the supporting element. By virtue of this design, the areas located outside the supporting frame and/or the supporting elements, containing slightly compressed fibers, contribute to sound absorption of high frequencies, while the areas of the supporting elements designed as Helmholtz resonators serve to absorb the low frequencies.

Absorption of sound can be accomplished by using Helmholtz resonators in conjunction with the uncompressed fibers in a broadband frequency range. The convexities in a dense sequence produce a large effective surface.

The convexities which follow one another in the lengthwise direction of the supporting frame and/or the supporting element can overlap one another. For example, the convexities can have an essentially V-shaped outline to produce overlapping. The adjacent convexities therefore may be brought into engagement with one another, producing additional stiffening. In addition to a V-shaped outline, the latter can also be made U-shaped or formed by staggered ribs. The supporting frame and/or the supporting elements have a groove which is U-shaped and open in the direction of the supporting element, so that in conjunction with the cup-shaped convexities, chambers are formed which form resonators. The housing lining according to the invention can be glued to any other substrate or clipped to it. For example, a holding element can be formed by the hood of a motor vehicle, with the housing lining being fastened to the side of the hood that faces the engine. If the housing lining according to the invention is used for example as a sealing lining in vehicle interiors, there is a possibility of covering the housing lining on the side facing the noise source with a surface coating made of porous, open-pored material. This can produce a further improvement in absorption, especially in the high-frequency range.

BRIEF DESCRIPTION OF THE DRAWINGS

An embodiment of the housing lining according to the invention will be described with reference to the following drawings:

FIG. 2 shows a cross section through the housing lining in FIG. 1, mounted on a holding body.

DETAILED DESCRIPTION

Figure 1:
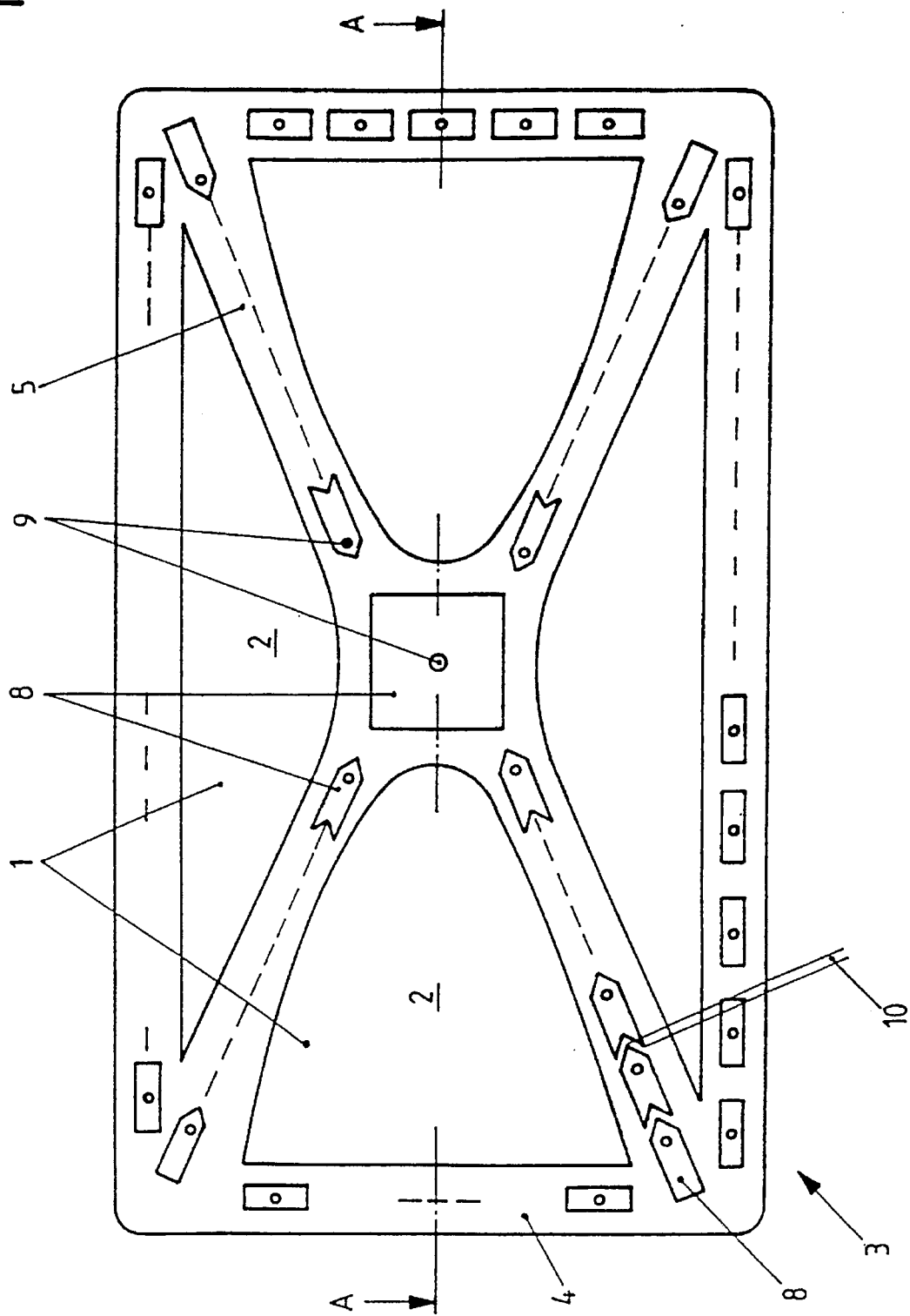
FIG. 1 shows a view of the housing lining according to the invention from the side facing the sound source.

FIGS. 1 and 2 show a housing lining for an internal combustion engine, which in this example is mounted on the inside of a hood 11. The housing lining consists of a sound-absorbent layer 1 made of fibers 2, with the edge 3 of the housing lining being compressed and glued to form a pore-free supporting frame 4. A phenolic resin with a polypropylene binder is used as the adhesive. In order to stiffen the housing lining, in addition to supporting frame 4, additional fibers 2 located inside supporting frame 4 are compressed and glued to form an essentially X-shaped supporting element 5. Supporting frame 4 and supporting element 5 together define a supporting structure. With an eye toward producing a surface for sound absorption that is as large as possible, provision is made within the scope of the present embodiment for both supporting frame 4 and supporting element 5 to have a plurality of cup-shaped convexities 8, each of which is provided with an opening 9 for air to pass through in the direction of the sound source to form Helmholtz resonators. Both convexities 8 and through openings 9 are tuned to the frequency of the sound and have different cross sections. The Helmholtz resonators in the vicinity of supporting frame 4 are made essentially rectangular and follow one another closely. Additional stiffening of the housing lining is accomplished in this embodiment by the fact that convexities 8 that follow one another closely along supporting element 5 overlap one another in the vicinity of their ends in a V-shaped manner. This is shown in FIG. 1 by overlap distance 10. This design produces additional guidance inside the housing lining.

It is clear from FIG. 2 that nearly the entire surface of the housing lining facing the sound is used for sound absorption. The entire housing lining is made in one piece and consists of fibers that have been compressed and glued in a nearly pore-free manner in the vicinity of supporting frame 4 and supporting element 5 to form Helmholtz resonators, while the non-glued areas consist of a sound-absorbent layer 1 made of fibers 2 which have been only slightly compressed, if at all. This design produces a broadband absorption of sound in various frequency ranges, since the resonators of different sizes and the only slightly compressed fibers are able to absorb sound at different frequencies.

While the present invention has been disclosed with respect to the above-described embodiments, it is contemplated that other embodiments may fall within the scope of the present invention.

What is claimed is:

1. A housing lining comprising a sound-absorbent layer of fibers;

wherein the housing lining includes a supporting structure comprising at least a supporting frame located at a peripheral edge of said layer of fibers;

wherein said supporting structure is formed of a first portion of fibers, wherein said first portion of fibers comprises compressed and glued fibers;

wherein said supporting structure substantially bounds at least one intermediate area formed of a second portion of fibers;

wherein the fibers in said supporting structure are more compressed than the fibers in said intermediate area; and wherein said supporting structure comprises at least one cup-shaped convexity forming a Helmholtz resonator with an opening for air to pass through.

2. A housing lining according to claim 1, wherein said Helmholtz resonators cover 25 to 60% of the total surface area of the housing lining.

3. A housing lining according to claim 1, wherein the convexities follow one another in a lengthwise direction of the supporting structure and overlap one another.

4. A housing lining according to claim 3, wherein the convexities have an essentially V-shaped outline to allow overlapping.

5. A housing lining comprising a sound-absorbent layer of fibers;

wherein the housing lining includes a supporting structure comprising at least a supporting frame located at a peripheral edge of said layer of fibers;

wherein said supporting structure is formed of a first portion of fibers, wherein said first portion of fibers comprises compressed and glued fibers;

wherein said supporting structure substantially bounds at least one intermediate area formed of a second portion of fibers;

wherein the fibers in said supporting structure are more compressed than the fibers in said intermediate area;

wherein said supporting structure further comprises a supporting element located inside of said supporting frame; and wherein said supporting structure comprises at least one cup-shaped convexity forming a Helmholtz resonator with an opening for air to pass through.

6. A housing lining according to claim 5, wherein said Helmholtz resonators cover 25 to 60% of the total surface area of the housing lining.

7. A housing lining according to claim 5, wherein the convexities follow one another in a lengthwise direction of the supporting structure and overlap one another.

8. A housing lining according to claim 7, wherein the convexities have an essentially V-shaped outline to allow overlapping.

* * * * *